United States Patent [19]
Tanaka

[11] Patent Number: 5,530,689
[45] Date of Patent: Jun. 25, 1996

[54] OPTICAL PICKUP

[75] Inventor: Haruo Tanaka, Kyoto, Japan

[73] Assignee: Rohm Co., Ltd., Kyoto, Japan

[21] Appl. No.: 220,500

[22] Filed: Mar. 31, 1994

[30] Foreign Application Priority Data

Apr. 12, 1993 [JP] Japan .................. 5-084872

[51] Int. Cl.[6] ..................... G11B 7/00
[52] U.S. Cl. .............. 369/121; 369/112; 369/124; 369/44.12
[58] Field of Search .................. 369/121, 116, 369/109, 112, 110, 124, 44.12, 44.28, 44.37, 44.41

[56] References Cited

U.S. PATENT DOCUMENTS 5,065,380  11/1991  Yokota ................... 369/109 X
5,233,444   8/1993  Musha et al. ........... 369/109 X
5,270,996  12/1993  Ono ....................... 369/112 X
5,408,450   4/1995  Nagahama et al. ........ 369/112 X Primary Examiner—Georgia Y. Epps
Assistant Examiner—Muhammad N. Edun
Attorney, Agent, or Firm—Nikaido, Marmelstein, Murray & Oram

[57] ABSTRACT

There is provided an optical pickup for use with an optical disk, which is capable of detecting tracking error signals and focusing error signals with good precision even when applied to the SCOOP method, and includes a light-emitting device having a light-emitting portion on a substrate for emitting light onto the optical disk, the light reflected by the optical disk being made to return to the light-emitting portion to vary oscillation of the light-emitting portion such that a signal recorded in the optical disk is read on the basis of a variation in the oscillation of the light-emitting portion, wherein an optical path length between the light-emitting device and the optical disk is set such that an interference intensity of interference fringes at a distance twice as large as the optical path length is at most one-tenth as large as a peak value of an interference intensity of interference fringes of a maximum intensity.

5 Claims, 6 Drawing Sheets

OPTICAL PICKUP

FIELD OF THE INVENTION

The present invention relates to an optical pickup and, more particularly, to a small-size optical pickup capable of correcting tracking errors and focusing errors with good precision without employing expensive optical components.

BACKGROUND OF THE INVENTION

High-density recording is feasible by using laser beam for read/write operation since such an operation is achieved by, in principle, focusing light on a spot having a diameter substantially equal to the wavelength of the laser beam used. Typically used in the optical recording are an optical disk (hereinafter referred to as "OD") as an information recording medium and an optical pickup using a laser device as means for achieving writing to and reading out of the OD.

Pits provided in the OD and storing information signals are of about 0.9 µm in size each, and lines of pits, or tracks, are arranged with a narrow pitch of about 1.6 µm. Accordingly, in a practical pickup operation, the detection of pits must be achieved while correcting a displacement of a track in a direction perpendicular to the tracks or a focusing deviation due to irregularities caused by revolution of the OD.

A conventional pickup employs an optical element, such as half mirror or hologram, as a beam splitter and is adapted to split light reflected from an OD to detect pits. In this case, a displacement of a track in a direction perpendicular to the tracks in the plane of the OD is corrected by, for example, the 3-beam method in which light from one laser diode (hereinafter referred to as "LD") as a light source is split into three beams by diffraction grating and these three beams are used to correct errors, while a focusing error is detected by, for example, the astigmatism method using a cylindrical lens.

Alternatively, there is developed a SCOOP ( Self Coupled Optical Pickup) method as disclosed, for example, Japanese Unexamined Patent Publication No. 72688/1991, wherein light reflected by an OD is returned to an LD (such light will be referred to as "returning light") and a signal is detected utilizing a change in oscillation state of the LD due to returning light. The objective of the SCOOP method is to reduce the number of optical components, such as beam splitter and cylindrical lens, as used in the aforesaid conventional pickup, to reduce the cost, and to facilitate precise positioning.

In this SCOOP method, there are used, for example, five LDs 41 to 45 which are linearly arranged as shown in FIG. 6. The central LD 43 is for detecting recorded signals, LDs 42 and 44 on both sides of LD 43 are each for detecting tracking error signals, and the outermost LDs 41 and 45 are each for detecting focusing error signals and are slightly shifted in opposite directions along the optical axis. These LDs for detecting error signals allow tracking errors and focusing errors to be detected.

Although the SCOOP method is able to detect signals with a simplified, less costly device without using expensive optical components, the oscillation of an LD is disturbed by returning light to make the LD instable. In addition, in detecting error signals or RF signals according to the SCOOP method, when the oscillation of the LD is disturbed to generate noise, a signal component is negated by such noise since a very fine fluctuation must be detected as the signal component. This results in a problem of inaccurate detection.

SUMMARY OF THE INVENTION

It is, therefore, an object of the present invention to overcome such problems and to provide an optical pickup capable of accurately detect signals for tracking servo and focusing servo even in the SCOOP method.

According to the present invention, there is provided an optical pickup comprising a light-emitting device; an objective lens for focusing light on an optical disk emitted from said light-emitting device; and a means for detecting a variation of quantity of light emission of said light-emitting device depending on a returning light returning to said light-emitting device reflected by said optical disk; wherein a position of the light-emitting device and the objective lens is set such that a distance twice as large as said optical path length is the distance so that there is substantially no interference component caused by the light-emitting device and the returning light.

It is preferable that the position of the light-emitting device and the objective lens is set such that the interference intensity caused by the light-emitting device and the returning light is at most one-tenth as large as the interference intensity when the optical path length is 0.

It is preferable that the light-emitting device is a multi-mode or pulsation-mode semiconductor.

It is preferable that said means for detecting a variation of quantity of light emission includes at least a photodetector provided in the neighborhood of said light-emitting device and an amplifier for amplifying a DC component of a signal detected by said photodector.

It is preferable that said photodector is formed of a photodiode, said optical pickup further including a current to voltage converting circuit for converting a current into a voltage of said photodiode, an AC component of an output voltage of said current to voltage converting circuit is input to the amplifier.

It is preferable that said means for detecting a variation of quantity of light emission includes at least a circuit for detecting voltage applied to the light-emitting device and an amplifier for amplifying a DC component of a signal detected by said circuit.

It is preferable that number of said light-emitting device is, at least three, number of the optical detector for detecting a variation of the light-emitting device is three with corresponding to the light-emitting device, each of the optical detector is connected to an amplifier for amplifying a AC component of a signal detected by the optical detector and a smoothing circuit, so that a tracking servo signal is output by using an output of circuit connected to two pieces of the optical detector and a focussing servo signal is output by using an output of the smoothing circuit connected to another two pieces of the optical detector.

It is preferable that said light-emitting device is a multi mode or pulsation mode semiconductor.

Preferably, the aforesaid light-emitting device is formed of a multimode semiconductor laser, and a position a light-emitting surface of the semiconductor laser and a focul point of the optical disk is set such that an interference intensity of interference fringes produced by light emitted from the semiconductor laser and its returning light reaches a midpoint intermediate between two adjacent peaks thereof at a distance twice as large as the optical path length.

Further, preferably, the aforesaid light-emitting device is formed of a pulsation-mode semiconductor laser, and a position of a light-emitting surface of the semiconductor laser and a focul point of the optical disk is set such that a distance twice as large as the optical path length is equal to or larger than a distance at which interference fringes produced by light emitted from the semiconductor laser and its returning light disappear.

In the optical pickup of the present invention, the optical path length between the light-emitting device and the OD is set such that the interference intensity of interference fringes at a distance twice as large as the optical path length is at most one-tenth as large as a peak value of the interference intensity of interference fringes of a maximum intensity, thereby eliminating the influence of interference due to returning light to avoid the occurrence of noise. This leads to precise reading of recorded signals from the OD.

When a semiconductor laser is used as the light-emitting device, its emission spectrum can be varied as single longitudinal mode, multi-longitudinal mode or pulsation mode by changing the structure design thereof. With the multimode LD, a peak of the intensity of interference fringes appears at constant intervals in proportion to the optical path difference. Alternatively, with the pulsation-mode LD interference disappears when the optical path difference exceeds a predetermined value. For this reason, if returning light is received in a situation where the interference intensity of interference fringes lies in a valley intermediate any two adjacent peaks thereof or the interference fringes substantially disappear, there will be no occurrence of interference between light emitted from the LD and its returning light nor of noise. Accordingly, if the optical path length between the LD and the optical disk is set such that the interference between emitted light and returning light disappears at the optical path difference, or a distance twice as large as the optical path length, the occurrence of interference can be avoided.

DETAILED DESCRIPTION

An optical pickup according to the present invention will now be described in detail with reference to the drawings.

Figure 1:
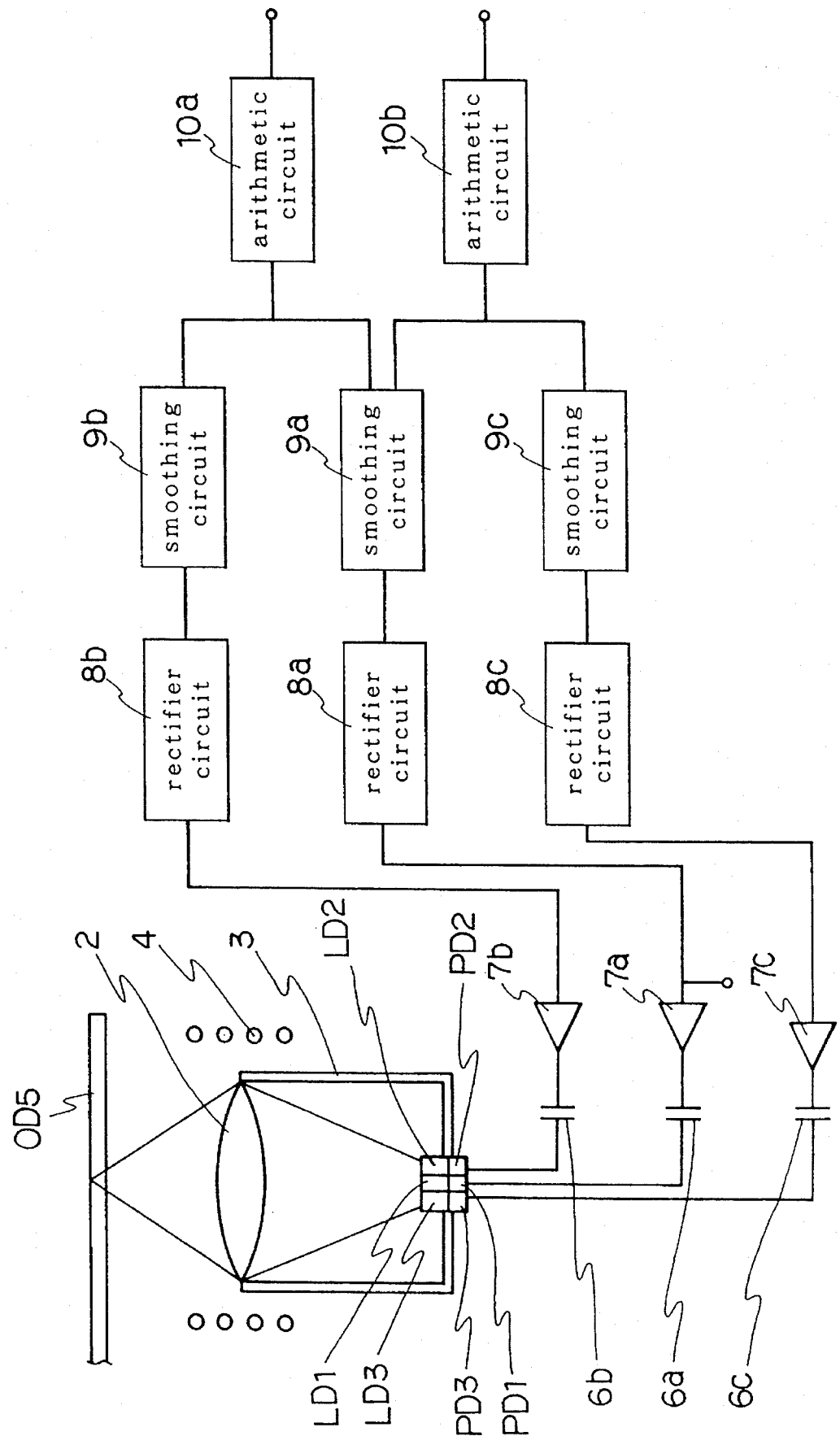
FIG. 1 is a block diagram showing a signal-processing part of one embodiment of an optical pickup according to the present invention.

Referring to FIG. 1, one objective lens 2 is disposed in front of three laser diodes LD 1 to LD 3 each having a light-emitting part and a photodetector. The objective lens 2 is circumferentially held by a lens holder 3 which is position-controlled by driving an electromagnetic coil by tracking servo mechanism and focusing servo mechanism to be described later, whereby a pit in the recording surface of an OD 5 is precisely illuminated with laser beam to allow detection of a recorded signal.

To efficiently detect a tracking error signal and a focusing error signal with precision, the present embodiment utilizes the fact that an error signal is modulated by a high frequency corresponding to repeating pits to extract only the high frequency component thereof. In turn the extracted high frequency component is amplified and then detected as the error signal. Specifically, photodetectors PD 1 to PD 3 detect changes in the quantity of returning light, capacitors 6a to 6c, for eliminating a direct current component, extract only high frequency components, and amplifiers 7a to 7c amplify the high frequency components to output RF signals. It is noted that although not shown in FIG. 1, there is provided in this embodiment a current-voltage converting circuit, such as made of a resistor, for converting current of the PDs to voltage which is disposed before or after the capacitors 6a to 6c since this embodiment is of L-SCOOP type.

To turn RF signals into tracking servo signal and focusing servo signal, the RF components thereof are, respectively, rectified by rectifier circuits 8a to 8c to convert them into DC components, so that the amplitudes of the RF components can be compared with each other. If the RF components cannot be turned into complete DC components, smoothing circuits 9a to 9c are further provided after the rectifier circuits 8a to 8c.

In this embodiment having three pairs of light-emitting part and photodetector, an arithmetic circuit 10a finds the difference between a DC component detected by PD 2 for tracking error signal and a DC component detected by PD 1 for recorded signal and feeds it to a tracking servo motor as a drive signal. Similarly, an arithmetic circuit 10b finds the difference between a DC component detected by PD1 and a DC component detected by PD3 and feed it to a focusing servo motor as a drive signal. In this case the RF signal representative of recorded information appears at the output of the amplifier circuit 7a for PD1. If there are five pairs of light-emitting part and photodetector, tracking servo signal and focusing servo signal may, respectively, be obtained from two combinations of PDs other than the PD for recorded signals.

The present invention is characterized in that the distance (i.e. length) which is twice that of the optical path length between the light-emitting element and the 0D is set such that the intensity of interference between light emitted from the light-emitting part and its returning light at a distance twice as large as the aforesaid distance is one-tenth or less as large as a maximum intensity of interference therebetween. It was found to prevent noise from occurring due to disturbance of oscillation of the light-emitting part by returning light. As a result, it was found the fact that although the SCOOP effect is developed by electric power generation which takes place, as in a solar cell, in such a manner that when returning light is not spotted on a pit, a maximum quantity of light returns to the cavity of the laser and is absorbed thereby, returning light has optical phase information as well as optical power information and the optical phase information is responsible for the disturbance of the operation of the light-emitting part. Accordingly, if the influence of the optical phase information of returning light is eliminated, the disturbance of the light-emitting part can be prevented thereby detecting recorded signals with low noise. It was found the fact that by using, for example, a multimode or pulsation-mode semiconductor LD as the light-emitting part and setting the distance between the LD and the OD to a predetermined distance or to any distance at which interference does not occur, the interference between the LD and its returning light can be prevented thereby avoiding generation of noise.

If the interference intensity of interference fringes is at most one-tenth as large as a peak value of a maximum interference intensity of interference fringes appearing when the optical path difference $\Delta L=0$, the influence of interference is a little and, hence, no problem will arise. On the other hand, if it exceeds one-tenth, the influence of interference will degrade the precision of the optical pickup, thus resulting in an optical pickup difficult to use practically.

It is to be noted that if the interference intensity of interference fringes is at most 1/100 as large as a peak value of the maximum interference intensity, the influence of interference fringes against the optical pickup is essentially negligible, which assures a further enhanced precision in optical pickup operation.

Figure 2A:
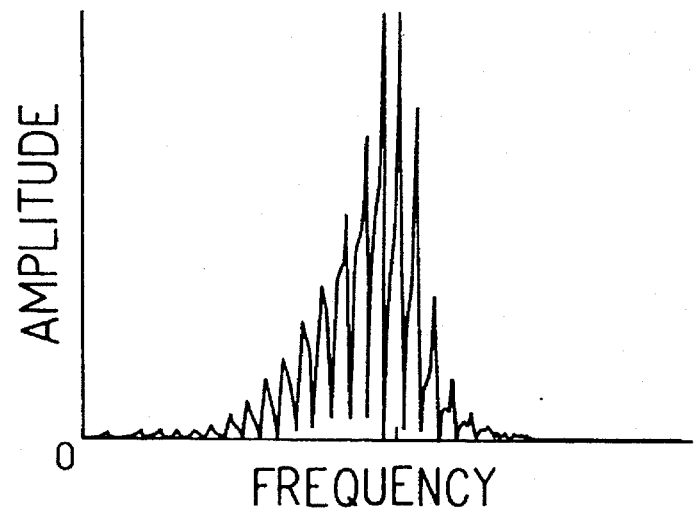
FIGS. 2(a) through 2(c) are diagrams showing spectrum of each of pulsation-mode LD, multimode LD and single-mode LD.
Figure 2B:
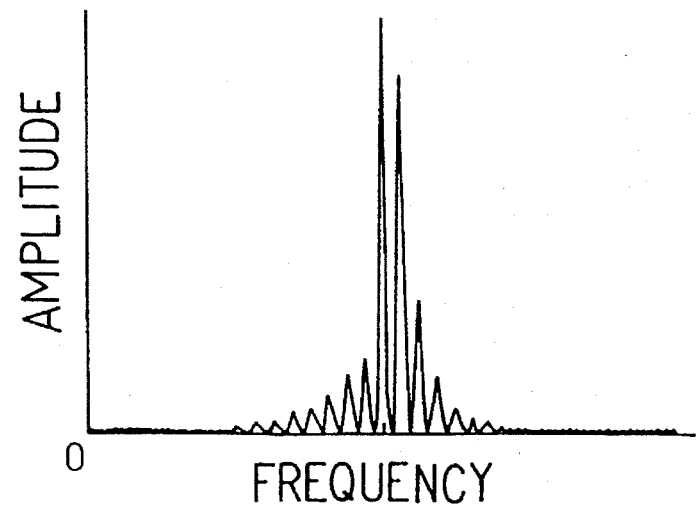
Figure 2C:
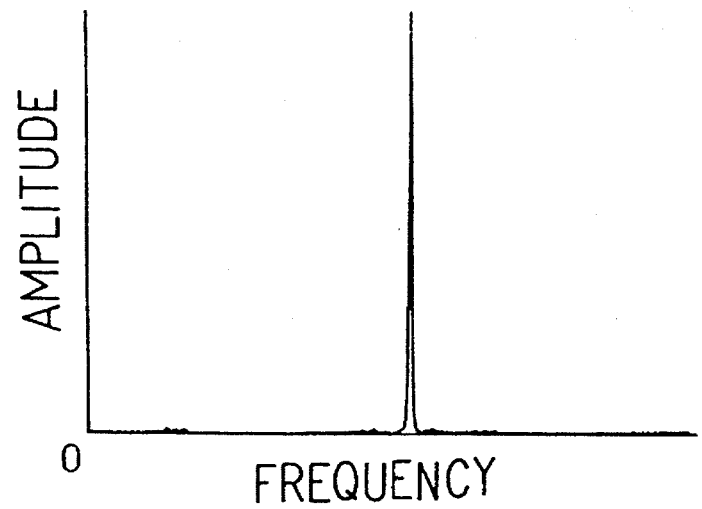

To be described next is the relation between the oscillation mode of LD and noise. There are three oscillation modes of LD; namely, pulsation mode, multimode and single mode as respectively shown in oscillation spectrum diagrams of FIGS. 2(a) to 2(c).

Figure 3:
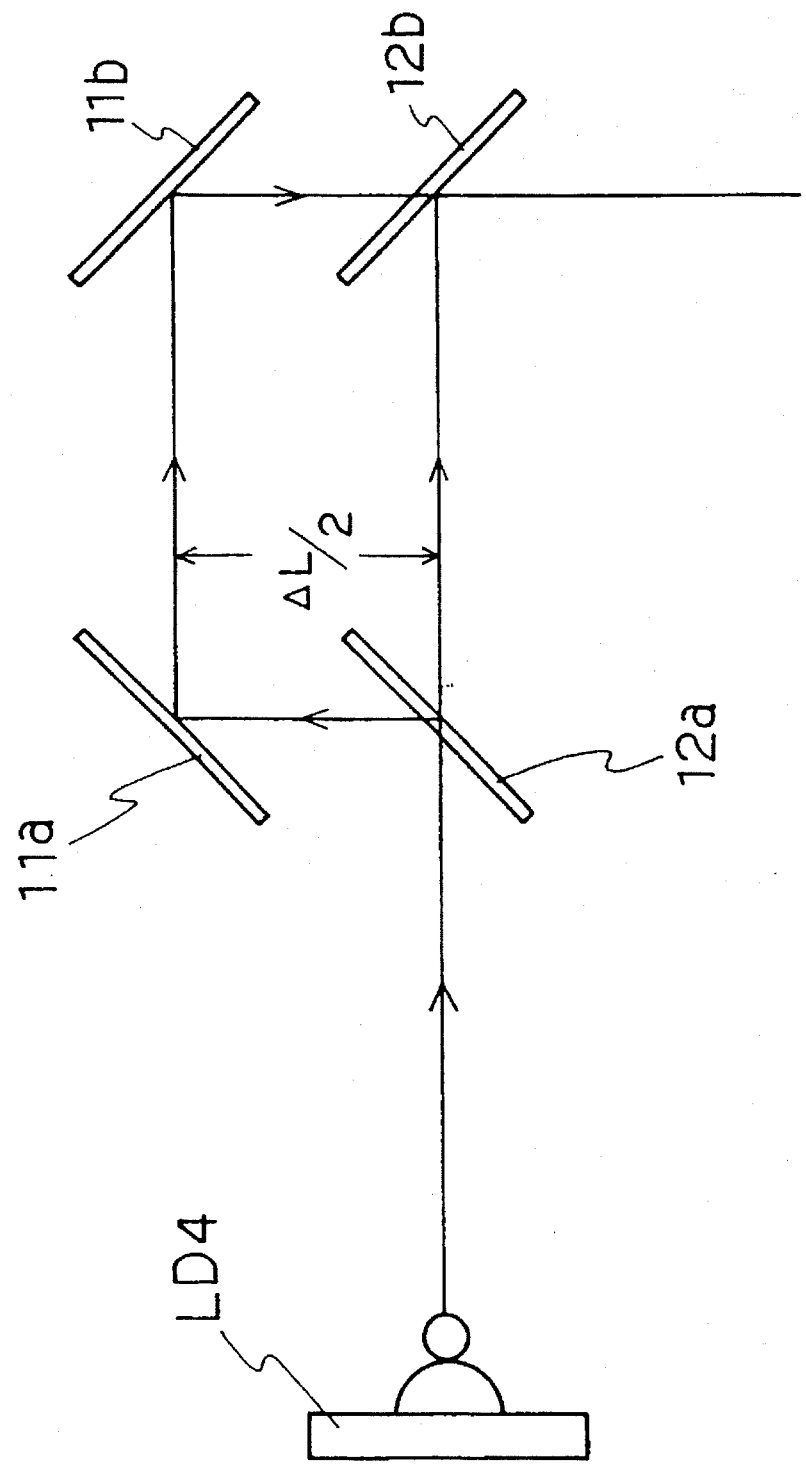
FIG. 3 is a schematic representation for Illustrating the way of examining the relation between the optical path difference and the interference intensity of intereference fringes.

There were examined the relation between the optical path difference and the intensity of interference fringes with respect to LDs of the respective three modes. In this examination, the measurement was conducted as in FIG. 3 wherein laser beam emitted from LD 4 is divided into two beams by half mirror 12a, one of the two beams is shifted by optical path difference $\Delta L$ using reflection mirrors 11a and 11b and then superposed on the other beam using half mirror 12b, and the resulting composite light is measured for its interference fringes by an interferometer or the like.

Figure 4A:
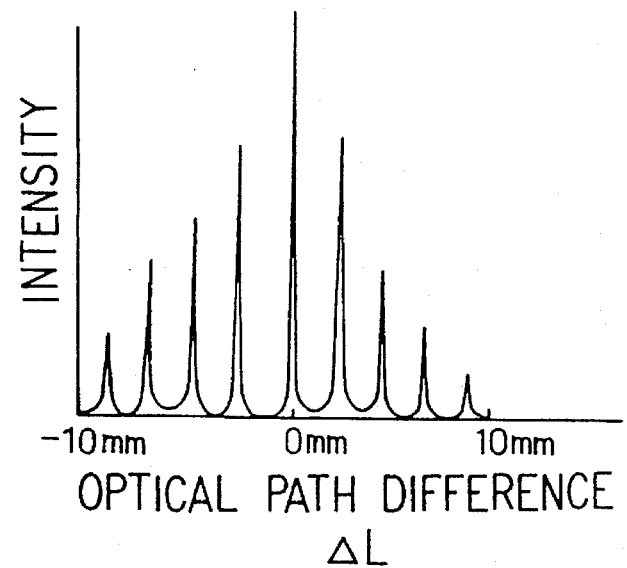
FIGS. 4(a) through 4(c) are graphic representations showing the interference intensity of interference fringes produced by each of pulsation-mode LD, multimode LD and single-mode LD.
Figure 4B:
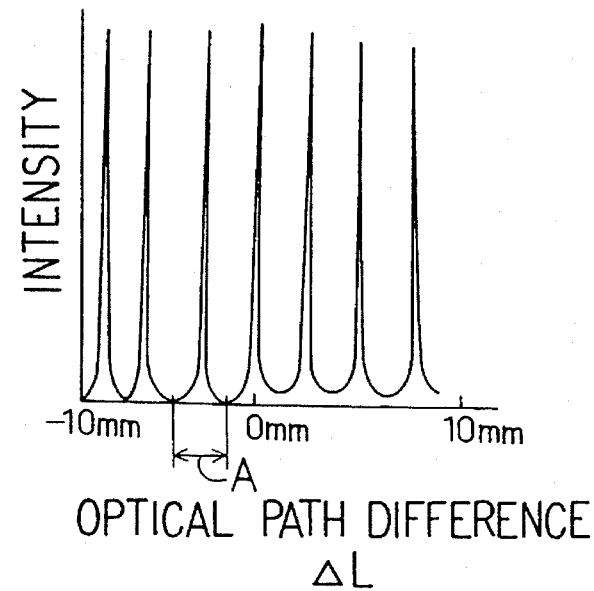
Figure 4C:
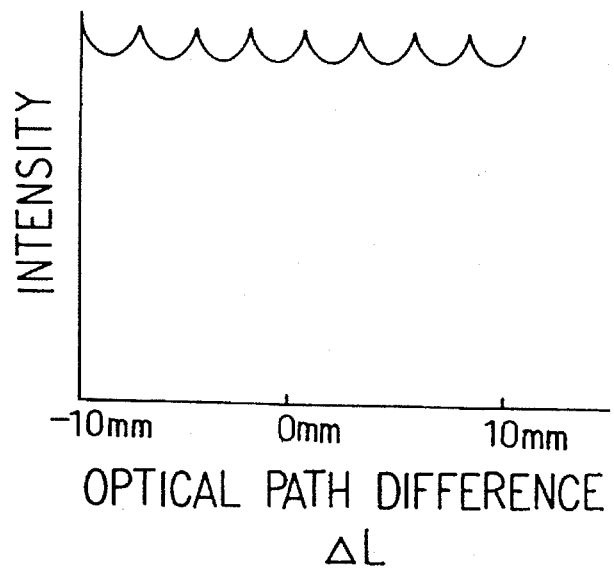

According to the results of the above measurement, with the single-mode laser the intensity of interference fringes was maintained as 0.8 to 0.9 or more even when optical path difference $\Delta L$ was 10 mm or larger, as shown in FIG. 4(c). In the case of the multimode laser, there appeared valley portions with a constant interval A in proportion optical path difference $\Delta L$, as shown in FIG. 4(b). Therefore, if the optical path difference, (or length which is i.e., the distance twice that of the optical path length between the LD and the OD in an optical pickup, is set to a value represented by $(n+\frac{1}{2}) \times A$ where n is an integer, recorded signals can be detected with no interference component. The interval A is found by 2×(the length of resonator of LD)×(refractive index). In this embodiment, the length of resonator was about 250 µm and the refractive index was about 4. Further, in the case of the pulsation-mode laser, the intensity of interference fringes sharply decreased with increasing optical path difference $\Delta L$ as shown in FIG. 4(a). Therefore, although the optical path difference can be set to coincide with an interference valley as with the case of the multimode laser, setting the optical path difference to a distance at which an interference component essentially disappears or larger makes it possible to substantially eliminate the influence of interference. Herein, the wording "an interference component essentially disappears" is meant by such a degree that a detected signal is not affected by noise, for example, to a degree at which the interference intensity is about one-tenth or less as large as a maxium intensity of interference fringes. As described earlier, when the interference intensity is at most 1/100 as large as a peak value of interference fringes of the maxium intensity, the influence of interference is very little and, hence, the precision of optical pickup operation can further be enhanced. Note that although in FIG. 4(a) the interference component essentially disappears when $\Delta L$ is about 10 mm, it is preferable that the distance (or length) which is twice that of the optical path length between LD and OD is set to 15 mm or larger in view of the configuration of the optical system.

Accordingly, in the case of an optical pickup using a multimode laser, as shown in FIG. 1, if objective lens 2 and LDs 1 to 3 are fine-adjusted with keeping them held by lens holder 3 so as to set the distance between LD and OD to the above-mentioned value and then tracking servo and/or focusing servo is made to operate, precise control can be achieved with no influence of interference.

With a pulsation-mode laser, similarly, tracking servo and/or focusing servo can be realized as with the multimode laser. Since there is no influence of interference when the distance between LD and OD is a fixed value or larger, controlling by moving only the objective lens 2 results in the same effect as above.

Figure 5A:
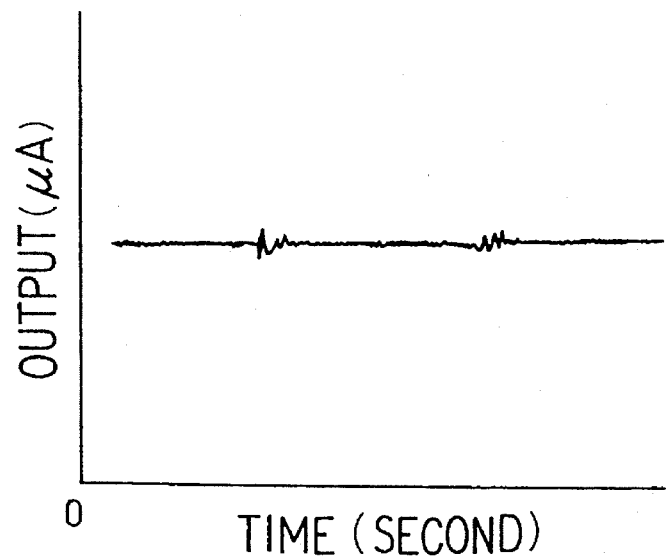
FIGS.5(a) through 5(c) are graphic representations showing output waveform of an optical pickup using each of pulsation-mode LD, multimode LD and single-mode LD.
Figure 5B:
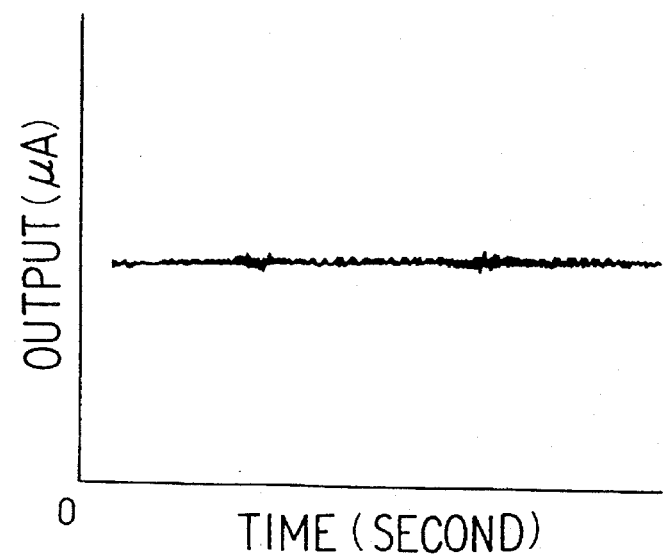
Figure 5C:
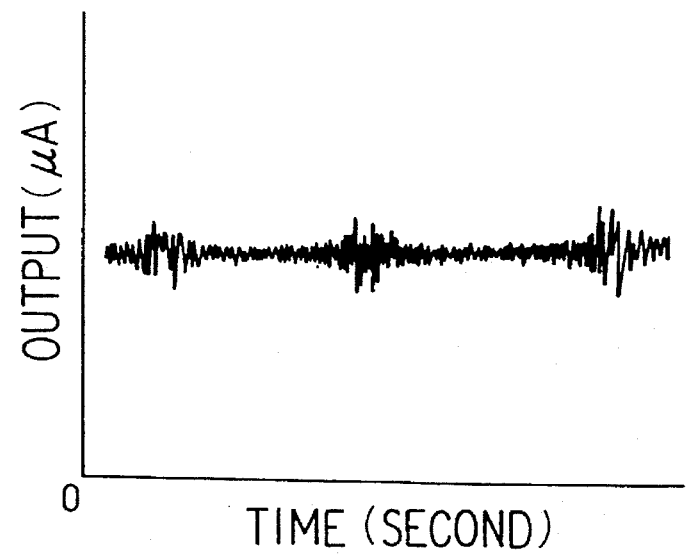
Figure 6:
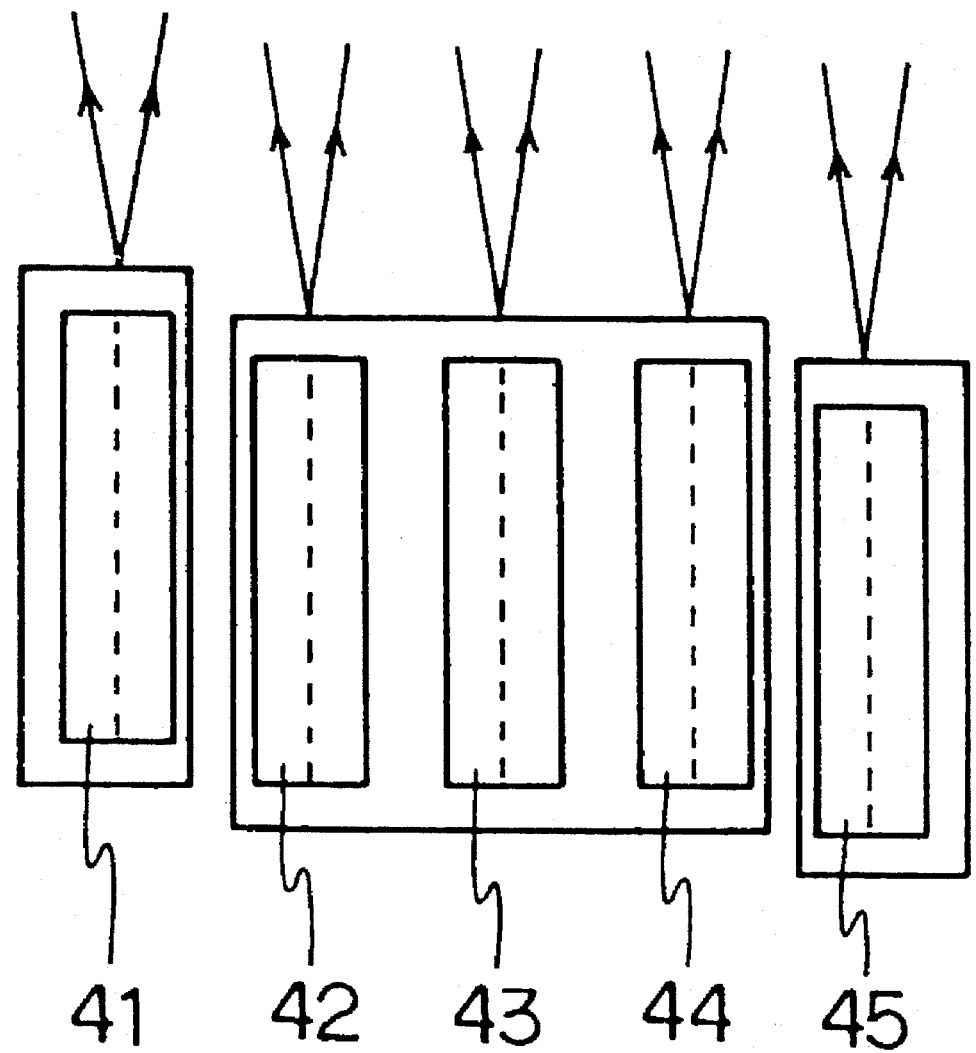
FIG. 6 is a plan view showing a light-emitting part of an exemplary conventional optical pickup.

The output was measured of the optical pickup shown in FIG. 1 and employing each of the pulsation-mode laser, multimode laser and single-mode laser. The results were as shown in FIG. 5. As apparent from FIG. 5, the output waveform, shown in FIG. 5(c), of the single-mode laser contained very much noise, while the output waveform, shown in FIG. 5(b), of the multimode laser contained substantially reduced noise. Further, the output waveform, shown in FIG. 5(a), of the pulsation-mode laser essentially comprised high frequency components serving as optical power information.

It should be understood that although an LD is used as the light-emitting device in the foregoing embodiment, any other light-emitting device having good directionality, for example, LED or EL may be used.

According to the optical pickup of the present invention, as has been described, the occurence of interference between emitted light and its returning light is avoided and, hence, there can be obtained substantially noiseless output signals each comprising optical power information only. This leads to precise readout of information recorded in an optical disk while achieving precise tracking and/or focusing servo effect. In addition, since the present invention simplifies the structure of an optical pickup, a small size, high quality, inexpensive optical pickup can be realized which keeps up with the recent trend of reducing in size of an optical disk and of increasing in operation speed.

Though several embodiments of the present invention are described above, it is to be understood that the present invention is not limited only to the above-mentioned, various changes and modifications may be made in the invention without departing from the spirit and scope thereof.

What is claimed is:

1. The optical pickup comprising:
   a light-emitting device;
   an objective lens for focusing light on an optical disk emitted from said light-emitting device; and
   a means for detecting a variation of quantity of light emission of said light-emitting device depending on a returning light returning to said light-emitting device reflected by said optical disk;
   wherein said light-emitting device is provided to have such an optical path length from said optical disk that no interference component is substantially caused between light from said light-emitting device and the returning light reflected from said optical disk, and wherein at least three light-emitting devices are provided, at least three optical detectors for detecting a variation of said light-emitting device are provided and correspond respectively to each said light-emitting devices, each of the optical detectors is connected to an amplifier for amplifying an AC component of a signal detected by the optical detector and a smoothing circuit, wherein a tracking servo signal is output by using outputs of said smoothing circuits connected to two of the optical detectors and a focussing servo signal is output by using outputs of said smoothing circuits connected to another two of said optical detectors.

2. The optical pickup of claim 1, said light-emitting device is a multimode of pulsation-mode semiconductor laser.

3. The optical pickup comprising:

a light-emitting device;

an objective lens for focusing light on an optical disk emitted from said light-emitting device; and a means for detecting a variation of quantity of light emission of said light-emitting device depending on a returning light returning to said light-emitting device reflected by said optical disk;

wherein said light-emitting device is provided to have such an optical path length from said optical disk that no interference component is substantially caused between light from said light-emitting device and the returning light reflected from said optical disk, and wherein said light-emitting device is formed of a multimode semiconductor laser, and wherein said multimode semiconductor laser is provided to have such a difference in optical path length between light from said multimode semiconductor laser and said returning light from said optical disk that an interference intensity of interference fringes produced by said light emitted from said multimode semiconductor laser and said returning light returned from said optical disk appears in a valley portion between two adjacent peaks.

4. The optical pickup of comprising:

a light-emitting device;

an objective lens for focusing light on an optical disk emitted from said light-emitting device; and a means for detecting a variation of quantity of light emission of said light-emitting device depending on a returning light returning to said light-emitting device reflected by said optical disk;

wherein said light-emitting device is provided to have such an optical path length from said optical disk that no interference component is substantially caused between light from said light-emitting device and the returning light reflected from said optical disk, and wherein said light-emitting device is formed of a pulsation-mode semiconductor laser, and wherein said pulsation-mode semiconductor laser is provided to have such a difference in optical path length between said light of said pulsation-mode semiconductor laser and said returning light from said optical disk that interference fringes produced by said light emitted from said pulsation-mode semiconductor laser and said returning light from said optical disk substantially disappear.

5. The optical pickup of claim 4, wherein said difference in optical path length is not smaller than 10 mm.

* * * * *